Figure 1:
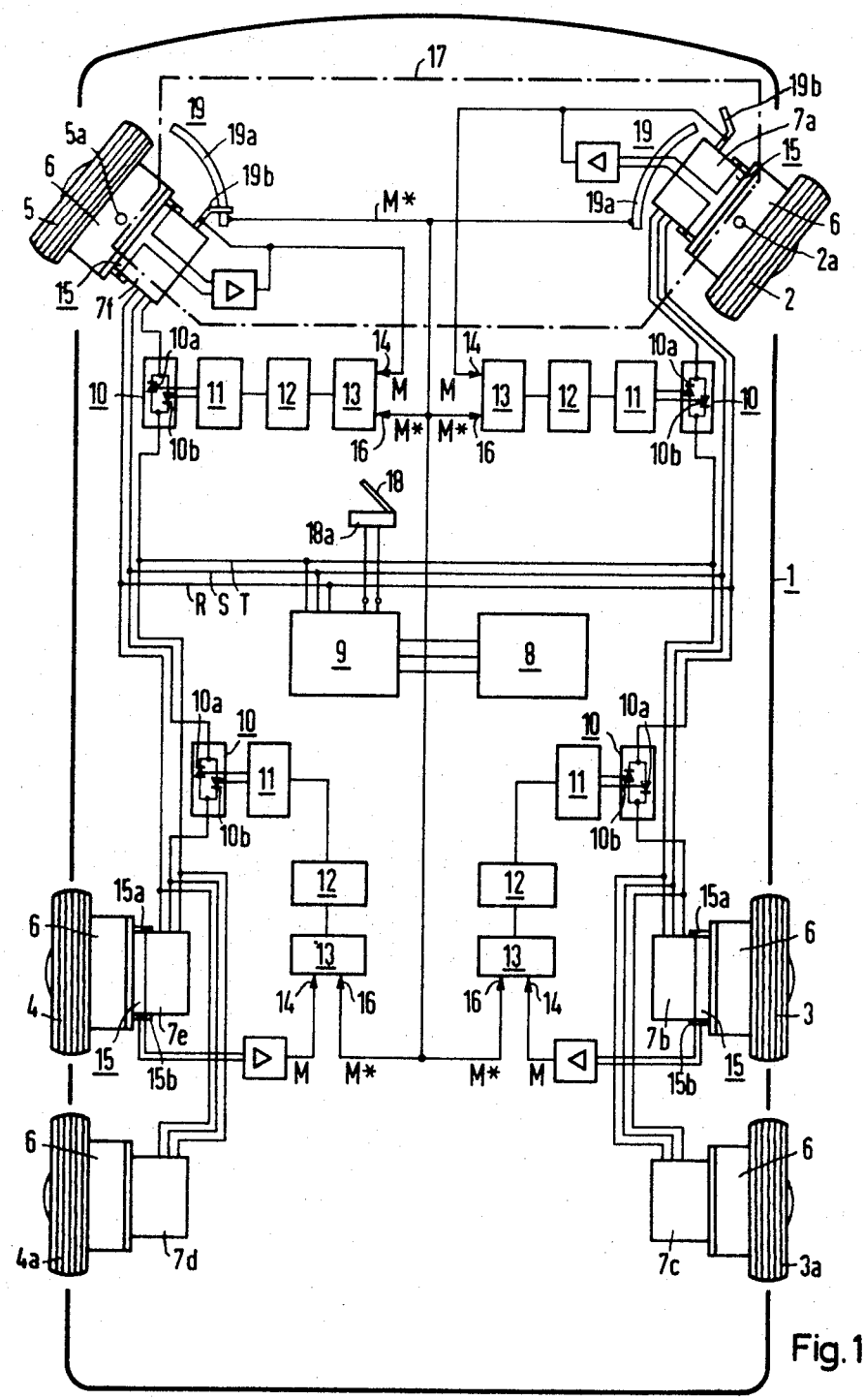

United States Patent [19]
Eisele et al.

[11] 3,756,335
[45] Sept. 4, 1973

[54] AUTOMOTIVE VEHICLE EQUIPPED WITH AN ALTERNATING-CURRENT DRIVE

[75] Inventors: Max Eisele, Erlangen; Gunter Wilhelm, Wiesenthau, both of Germany

[73] Assignee: Siemens Aktiengesellschaft, Berlin and Munich, Germany

[22] Filed: Mar. 5, 1971

[21] Appl. No.: 121,356

[30] Foreign Application Priority Data
Mar. 6, 1970 Germany.................. P 20 10 594.6

[52] U.S. Cl.................... 180/6.28, 180/6.5, 318/52
[51] Int. Cl............................................. B62d 11/04
[58] Field of Search.................. 180/6.28, 6.5, 44 E; 318/52

[56] References Cited
UNITED STATES PATENTS

| | | | |
|---|---|---|---|
| 3,596,154 | 7/1971 | Gurwicz et al. | 318/52 |
| 2,787,331 | 4/1957 | Tourneau et al. | 180/6.5 |
| 2,962,642 | 11/1960 | Brane | 180/6.5 X |
| 3,280,928 | 10/1966 | Roe | 180/6.5 |
| 3,614,564 | 10/1971 | Hirotsu et al. | 318/52 |

*Primary Examiner*—Benjamin Hersh
*Assistant Examiner*—Leslie J. Paperner
*Attorney*—Curt M. Avery, Arthur E. Wilfond, Herbert L. Lerner and Daniel J. Tick

[57] ABSTRACT

An automotive vehicle equipped with wheels connected to induction motors through transmissions is provided with a speed control apparatus connected to the induction motors for adjusting the speed of rotation or RPM of the wheels. The speed control apparatus has a voltage supply and a converter connected to this supply and to at least some of the motors to supply the latter with a voltage changeable in magnitude and frequency. At least one voltage control member is connected between at least one of the motors and the converter. A control device actuable when the vehicle travels along a curved path is connected to the voltage control member for adjusting the RPM of the one motor as required to permit the vehicle to negotiate the curve.

8 Claims, 2 Drawing Figures

AUTOMOTIVE VEHICLE EQUIPPED WITH AN ALTERNATING-CURRENT DRIVE

Our invention relates to an automotive vehicle whose wheels are connected through gear mechanisms with asynchronous or induction motors. The motors are supplied from a voltage source through a converter arrangement for controlling the revolutions per minute or RPM thereof. The converter arrangement provides a changeable frequency and a voltage. The wheels of the vehicle are driven at various RPM's respectively when the vehicle makes a turn.

An alternating current drive for vehicles is known wherein each wheel is driven by an induction motor. Each motor is connected to a direct-current voltage source through its own converter. To change the RPM and torque of the motors, the converters are controlled by means of a control apparatus with regard to their frequency and voltage. For imparting the same RPM to each wheel, all converters are controlled in the same manner. With different wheel RPM's, for example as occur when the vehicle is turning or as required when the wheels have respectively different diameters, each motor is controlled by its converter individually.

With such a drive configuration one does indeed do all right with simple induction motors as drive motors. However, the application of the many converters for changing the frequency and voltage is very costly. Therefore, only direct-current motors are used in most instances or as in the case of a railway drive, single phase alternating current motors are used as the source of motor power since simple regulating units are adequate.

Accordingly, it is an object of our invention to provide a drive for vehicles which incorporates the advantages of induction motors but, however, precludes the high cost of the converters for changing the frequency and voltage. Subsidiary to this object is another object of our invention to provide a drive arrangement wherein induction motors provide different RPM's without each asynchronous motor being required to have a separate converter to change frequency and voltage.

According to the feature of the invention at least some of the induction motors are connected to an energy source via a common converter with changeable frequency and voltage and, additionally, at least one of the induction motors supplied from the common converter has connected to it at its front end a voltage control which is connected to a control apparatus that goes into operation when the vehicle travels through a curve.

In this manner it is possible to variably adjust with simple means the torque-RPM characteristics of the induction motors when the vehicle travels the curve with simple means. Also, it is possible in this manner to obtain the required various wheel RPM's with approximately the same torque for all wheels.

With a voltage control member, it is not necessary to control the entire power of the corresponding induction motor, instead, only the power required for the difference of the relative speed of rotation of the driven wheels. According to the invention this is achieved with substantially simpler control means since a control means for a common converter for changing the frequency and voltage of the induction motors and for the voltage control members corresponding to the individual asynchronous motors can be constructed in a simpler manner as contrasted to a control means wherewith each motor is provided with a converter for controlling the frequency and voltage.

Figure 2:
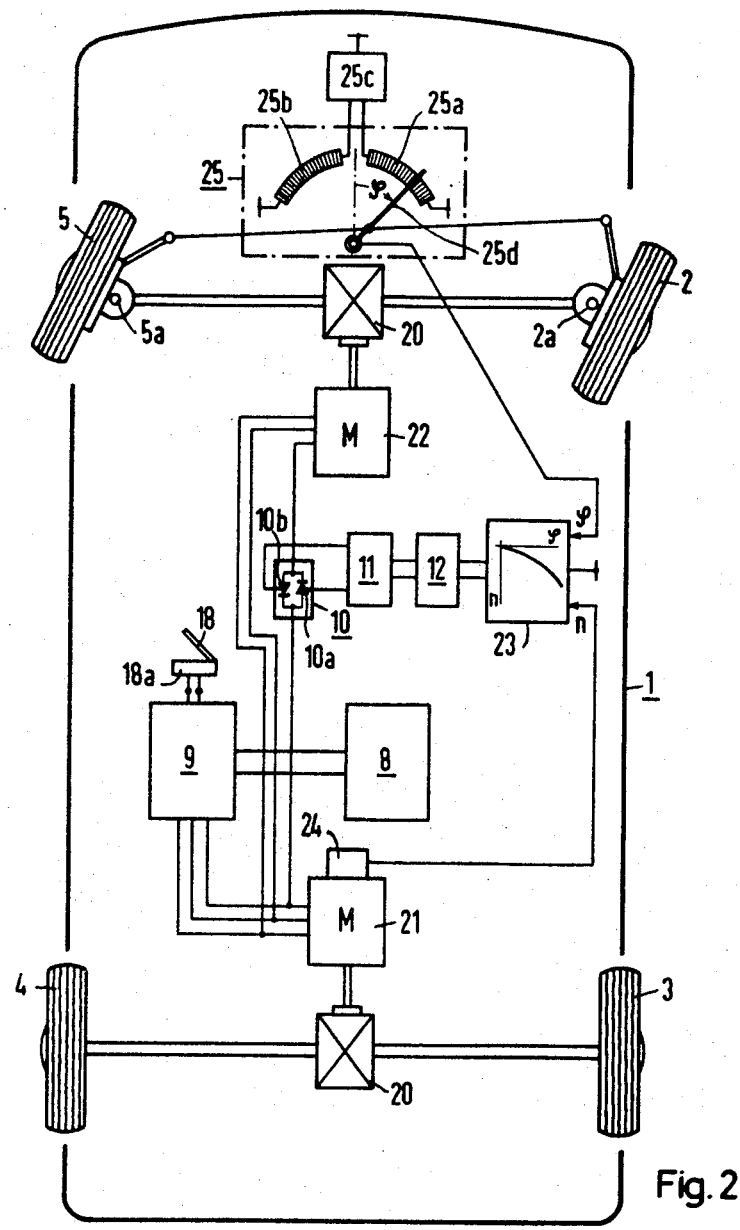

The invention will now be described with reference to the drawing wherein:

FIG. 1 is a schematic diagram of a vehicle wherein each wheel thereof is provided with a drive and a control arrangement as required by the invention; and FIG. 2 is a schematic diagram of a vehicle equipped with two drive motors and a control arrangement and is an alternate embodiment of the embodiment of FIG. 1.

FIG. 1 illustrates a vehicle wherein all wheels 2, 3, 3a, 4, 4a and 5 are connected via drives 6 with their own asynchronous or induction motors 7a to 7f. The front wheels 2 and 5 can turn about the connection points 2a and 5a, respectively, for travel through curves. The front curve outer wheel 5 has the largest RPM. With the vehicle according to the invention, all the induction motors 7a to 7f are supplied for RPM control via a common converter 9 with variable frequency and voltage from the alternating current source 8.

At the front end of all asynchronous motors 7a to 7f there is provided, in addition, a voltage regulating member 10 which is connected with a controller 13. Controller 13 is set into operation when the vehicle travels a curve. In this connection, according to a further feature of the invention, the induction motor groups 7b, 7c and 7d, 7e are respectively supplied with a common voltage regulating member 10. The asynchronous motors 7b, 7c and 7d, 7e are driven during travel through a curve with approximately the same RPM. The voltage regulating member 10 is preferably configured of thyristors 10a, 10b in parallel connection.

The thyristors 10a, 10b are controlled by an impulse generator 11 which in turn is controlled by a controller 13 via a control device 12. The actual value input 14 of controller 13 is connected with a detecting transmitter 15 for detecting the torque M of the corresponding induction motor, whereas the reference value input 16 is connected with a reference value source 17 which detects the torque of the induction motor 7f corresponding to the curve outer wheel 5. Herewith, front wheels 2 and 5 are provided with respective contact assemblies 19. Each of the assemblies 19 is provided with an arm 19b sliding on a contact track 19a. The contact arm 19b is connected to a corresponding detecting transmitter 15. The contact assembly 19 is constructed so that only the detecting transmitter 15 of the curve outer wheel 5 provides a torque reference value M*.

When the vehicle drives in a straight line path, the common converter 9 is so adjusted with regard to its frequency and voltage by the driver through actuation of the foot pedal 18 of the control device 18a that the desired same RPM of the motors 7a to 7f of the wheels 2, 3, 3a, 4, 4a and 5, respectively, is obtained. When traveling in a curved path, a definite adjustment of the converter 9 is maintained and the required different RPM's of the wheels are specified by the detector transmitter 15 of wheel 5, the transmitter 15 serving as a reference value transmitter. After a comparison of the reference torque M* with the actual torque M in the controllers 13, an approximately equal torque is adjusted for all induction motors by the corresponding voltage control member 10 wherewith each wheel turns with the RPM required by a specific steering wheel position.

The torque from the motor shaft is transferred to the transmission 6 and, in the customary manner, is detected on the motor shaft by means of a measuring device with a movable part or electrically at high cost. In this connection, it is difficult to transfer the measured value from the rotating shaft of the motor to a line for transmitting the measured value disposed on the stationary part of the vehicle. According to a feature of the invention, the detector transmitter 15 for detecting the torque M of an induction motor is so configured that it detects the reaction torque of the rotor of the induction motor on the stator or the housing of the motor. For this purpose, the transmitter 15 is equipped with at least one measuring element, especially a strain gauge 15a, which in a simple manner is secured outside on the housing of the motor. The motor is flange connected to the transmission 6. In this way, all rotating transmission members are rendered unnecessary and a construction with simple components is achieved.

Preferably, the detector transmitter 15 contains at least two strain gauges 15a, 15b arranged so that influences caused by bumps or other shocks imparted to the motor are eliminated. For this purpose, for example, the one strain gauge is placed below and the other strain gauge is placed above the housing of the motor so as to be at mutually opposite locations. The vertical movement of the motor arising from a bump results in a compression of the lower strain gauge and an expansion of the upper strain gauge. If both strain gauges are serially connected, the effect of a vertical shock on the measured result is eliminated.

In accordance with another configuration, two strain gauges 15a, 15b are arranged laterally on the housing so that they lie in a neutral response zone with respect to a shock on the motor. In order to increase the measuring accuracy, it is preferable to arrange the strain gauges 15a, 15b in a bridge circuit arrangement.

To change the voltage of the induction motors, it is required to connect a voltage control member in each supply bus of the motor and to control the latter in correspondence to the phase sequence. According to a further feature of the invention, the voltage control member 10 is arranged in only one supply bus. In this manner, there is achieved a substantial reduction of the cost of control members and control means. In this connection, it is advantageous to arrange the voltage control members 10 of both front wheels in the same supply line corresponding to the T-phase and to arrange the voltage control members of the rear wheels in both of the other supply lines corresponding to the R and S-phases. In this way, a minimum for the dissymmetry of the three phase system is obtained.

In the illustrated embodiment, the RPM's of wheels 2, 3, 3a, 4, 4a and 5, which RPM's have dissimilar values when the vehicle travels in a curve, are self-adjusting by means of the control apparatus 13 via a reference value transmitter 17. In vehicles where the front wheels 2 and 5 are rigidly mounted and in which travel through a curve is obtained by different adjustments of the RPM's of the wheels, the regulator 13 can be configured with a reference value transmitter 17 by means of a control apparatus with a handle movable manually.

As illustrated in FIG. 2, a further simplification with the vehicle 1 having four wheels 2 to 5 is possible when the wheels of each axis are driven from induction motor 21 or 22 through a differential transmission 20. Both induction motors 21 and 22 obtain their electrical energy from a direct-current voltage source 8 by a common converter 9 providing a voltage of changeable frequency and magnitude. The velocity of the vehicle is obtained with a control device 18a which works in combination with the common converter 9 and the pedal 18 contained with device 18a. The converter changes the energy directed to the induction motors with regard to frequency and voltage. In this way, motor 21 is fed directly via the converter 9 from a voltage source 8, whereas motor 22 is driven via converter 9 and additionally via a voltage control member 10 influenced by a control apparatus.

Thyristors 10a, 10b are in antiparallel connection and are connected with a function generator 23 via a pulse generator 11 and the control device 12. This function generator 23 is connected at its input side to a tacho-generator 24 for providing a signal proportional to motor RPM and to a signal sender 25, the latter providing a signal proportional to the radius of curvature of the curve traveled by the vehicle. Electrical components are contained in the function generator which are dependent upon the two input signals: the RPM n and the curve radius $\phi$ which develop an output signal for the control device 12 which has a characteristic approximating the one shown in the drawing relative to item 23. The signal transmitted to the voltage control member 10 has a characteristic shaped so that the motor 22 always reaches an RPM which it should have according to the corresponding curve radius. Differences in RPM of the wheels of each axis are balanced out in the known manner by means of the differential transmissions 20.

The signal proportional to the curve radius can be taken from the potentiometers 25a, 25b of the signal sender 25. Potentioneters 25a, 25b are connected with a voltage source 25c. For this purpose, a sliding contact 25d is provided which in turn is coupled to the steering mechanism of the vehicle.

In straight line travel, the common converter 9 is controlled with regard to its frequency and voltage by actuation of the foot pedal 18 of the control device 18a so that the motors 21, 22 obtain the desired RPM. The RPM's for the wheels 2, 3, 4 and 5 have various respective values when the vehicle negotiates a turn and these RPM's are self-adjusting by means of the function generator 23 of the control apparatus when a definite adjustment of the converter 9 is maintained.

In accordance with another embodiment, not illustrated in the drawings, the function generator 23 or the voltage control member 10 can be controlled by a manually actuated handle.

While the invention has been described by means of specific examples and in a specific embodiment, we do not wish to be limited thereto, for obvious modifications will occur to those skilled in the art without departing from the spirit and scope of the invention.

We claim:

1. In an automotive vehicle equipped with wheels connected to induction motors through transmissions, speed control apparatus connected to said induction motors for adjusting the RPM of the wheels, said apparatus comprising voltage supply means, a converter connected to said supply means and to all of said motors to supply the latter with a voltage changeable in magnitude and frequency, at least one voltage control member connected intermediate at least one of said motors and said converter, and control means actuable when said vehicle travels along a curved path, said control means being connected to said voltage control member for adjusting the RPM of said one motor as required to permit the vehicle to negotiate the curve.

2. In a vehicle according to claim 1 wherein a plurality of said voltage control members are connected intermediate said converter and said induction motors respectively.

3. In a vehicle according to claim 1 wherein some of said induction motors are grouped into sets of motors, one of said voltage control members being connected to each of said sets for driving the motors of each set at approximately the same RPM when the vehicle negotiates a curve.

4. In a vehicle according to claim 1, said apparatus comprising controller means connected to said voltage control members.

5. In an automotive vehicle equipped with wheels connected to induction motors through transmissions, speed control apparatus connected to said induction motors for adjusting the RPM of the wheels, said apparatus comprising voltage supply means, a converter connected to said supply means and to at least some of said motors to supply the latter with a voltage changeable in magnitude and frequency, at least one voltage control member connected intermediate at least one of said motors and said converter, and control means actuable when said vehicle travels along a curved path, said control means being connected to said voltage control member for adjusting the RPM of said one motor as required to permit the vehicle to negotiate the curve, said control means comprising a reference value source for detecting the torque of the motor corresponding to the curve outer wheel, detecting transmitter means for detecting the respective actual torques of said motors corresponding to said wheels respectively, and controller means connected at its input side to said transmitter means and said reference value source for obtaining therefrom actual value and reference value torque signals, said controller means being connected to said voltage control members to adjust the RPM's of the motors corresponding to the latter in response to said torque signals.

6. In an automotive vehicle according to claim 5, wherein each of said motors has a stator structure and wherein said detecting transmitter means comprises a plurality of detecting transmitters disposed with respect to corresponding ones of said motors, each of said detecting transmitters comprising measuring means mounted on said stator structure so as to be unaffected by shocks imparted to said structure as a consequence of irregularities in the surface over which the vehicle travels.

7. In an automotive vehicle equipped with wheels connected to induction motors through transmissions, speed control apparatus connected to said induction motors for adjusting the RPM of the wheels, said apparatus comprising voltage supply means, a converter connected to said supply means and to at least some of said motors to supply the latter with a voltage changeable in magnitude and frequency, at least one voltage control member connected intermediate at least one of said motors and said converter, and control means actuable when said vehicle travels along a curved path, said control means being connected to said voltage control member for adjusting the RPM of said one motor as required to permit the vehicle to negotiate the curve, said control means comprising a tacho-generator for providing a signal indicative of motor RPM, a signal sender for providing a signal proportional to the radius of curvature of the curve traveled by said vehicle, and a function generator connected at its input side to said tacho-generator and said signal sender for receiving said signals therefrom, said induction generator being connected to said voltage control member for adjusting the RPM of the motor corresponding to the latter in response to said signals.

8. In an automotive vehicle equipped with wheels connected to induction motors through transmissions, speed control apparatus connected to said induction motors for adjusting the RPM of the wheels, said apparatus comprising voltage supply means, a converter connected to said supply means and to at least some of said motors to supply the latter with a voltage changeable in magnitude and frequency, at least one voltage control member connected intermediate at least one of said motors and said converter, and control means actuable when said vehicle travels along a curved path, said control means being connected to said voltage control member for adjusting the RPM of said one motor as required to permit the vehicle to negotiate the curve, said induction motors being three-phase induction motors each having a bus supply for each phase, said voltage control member being connected in only one of said bus supplies.

* * * * *